United States Patent [19]
Asai et al.

[11] 3,919,106
[45] Nov. 11, 1975

[54] LIQUID CRYSTAL DISPLAY DEVICE
[75] Inventors: Komei Asai, Hiraka; Akio Moriyama; Hiroshi Tatsuta, both of Katano; Masakazu Fukai, Nishinomiya, all of Japan
[73] Assignee: Matsushita Electric Industrial Co., Ltd., Osaka, Japan
[22] Filed: Apr. 15, 1974
[21] Appl. No.: 460,874

[30] Foreign Application Priority Data
Apr. 20, 1973 Japan............ 48-45374
Apr. 20, 1973 Japan............ 48-45377
Apr. 20, 1973 Japan............ 48-45378

[52] U.S. Cl............ 252/299; 252/408 LC; 350/160 LC
[51] Int. Cl.².................................. C09K 3/34
[58] Field of Search............ 252/408 LC, 299; 350/160 LC

[56] References Cited
UNITED STATES PATENTS
| 3,697,150 | 10/1972 | Wysocki | 252/408 LC |
| 3,803,050 | 4/1974 | Haas et al. | 252/408 LC |
| 3,809,456 | 5/1974 | Goldmacher et al. | 252/408 LC |
| 3,819,531 | 6/1974 | Saeva et al. | 252/408 LC |

Primary Examiner—Benjamin R. Padgett
Assistant Examiner—T. S. Gron
Attorney, Agent, or Firm—Stevens, Davis, Miller & Mosher

[57] ABSTRACT
A liquid crystal display device which comprises a nematic liquid crystal material and a novel additive which imparts an homeotropic structure thereto is improved in transparency and can thereby produce effective display.

4 Claims, 2 Drawing Figures

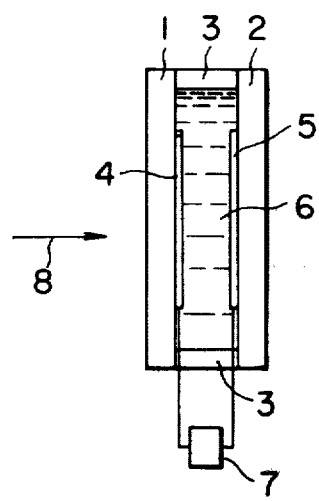
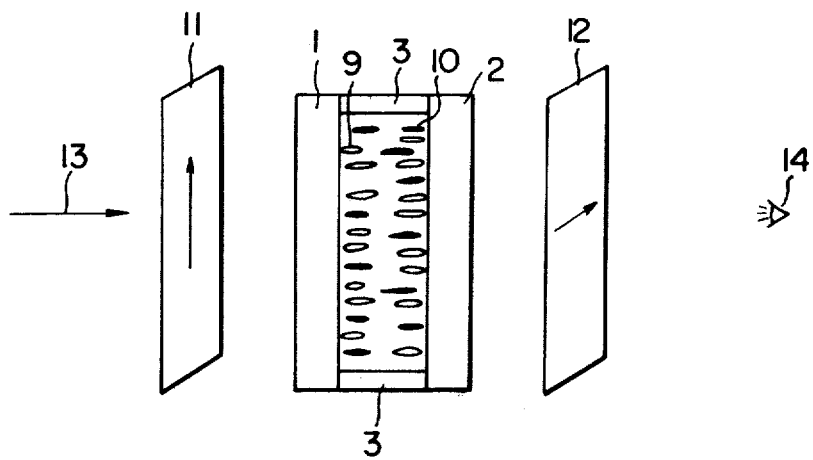

LIQUID CRYSTAL DISPLAY DEVICE

The present invention relates to liquid crystal display devices and more particularly it relates to additives for imparting homeotropic structure to a nematic liquid crystal.

According to the present invention, a homeotropic structure is imparted to a liquid crystal by adding an additive to the liquid crystal itself. The additives used in the present invention are represented by the following general formula:

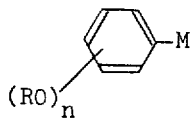

wherein M represents

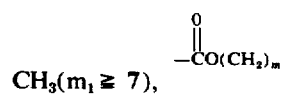

$CH_3(m_1 \geq 7)$,

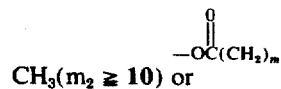

$CH_3(m_2 \geq 10)$ or

$CH_3(m_3 \geq 10)$;

—OR is an alkoxy group; $n$ is 1, 2 or 3; and when $n$ is 1, the alkoxy group is at para-position, when $n$ is 2, the alkoxy groups are at meta-position and when $n$ is 3, the alkoxy groups are at meta and para-positions with reference to M.

One or more of said compounds or in admixture with other additives capable of providing homeotropic structure are added in an amount of 0.5 to 5 % by weight to liquid crystal material. Addition of said additives in an amount of more than 5 % by weight may provide homeotropic structure, but, in many cases, causes a decrease of the upper limit of the temperature range in which the liquid crystal state is maintained and no longer causes improvement of the homeotropic structure.

The liquid crystal materials to which said additives are added have no limitation and examples thereof are Schiff base, azobenzene, azoxybenzene, alkoxy benzoic acid, phenyl benzoate, etc. FIG. 1 is a longitudinal section of the liquid crystal display device embodying the invention.

FIG. 2 is a rough sketch of an apparatus for determining whether a liquid crystal material is in the homeotropic state or not.

In FIG. 1, 1 and 2 are glass substrates which are parallel and are separated by a distance of several microns by means of electrically insulating spacer 3. On the inner surface of the glass substrate 1 is thin transparent conductive film 4 mainly composed of, for example, tin oxide, indium oxide, etc. and on the inner surface of the glass substrate 2 is conductive film 5 mainly composed of, for example, tin oxide, indium oxide, etc. as a thin transparent conductive film, a vacuum deposited thin metallic film, a thin transparent conductive film with a mirror of dielectrics or a modification of these conductive films. The space between the glass substrates 1 and 2, in other words, between the thin film electrodes 4 and 5 is filled with liquid crystal material 6. A voltage is applied to the liquid crystal material 6 through the electrodes 4 and 5 from outer electric source 7, whereby the outer light 8 is modulated to make a display.

FIG. 2 shows the relative relation of positions of the glass substrates 1 and 2 and liquid crystal molecules 9 and the additive 10 of the present invention. By addition of the additive to a liquid crystal material, the longer axes of the liquid crystal molecules align perpendicular to the surface of the glass substrates 1 and 2 as shown in FIG. 2. This structure of the liquid crystal is known as the homeotropic structure.

Whether the liquid crystal has the homeotropic structure or not can be determined as follows: Linear polarizing plates 11 and 12 are placed in front of and at the back of the liquid crystal display device in such a manner that polarizing directions of the polarizing plates are crossed perpendicular to each other. When the liquid crystal structure in the liquid crystal display device has an homeotropic structure, the incident light 13 does not subtantially reach observer 14.

Examples of the methods for liquid crystal displaying with use of the homeotropic structure are as follows:

1. Dynamic scattering occurs in an ion stream caused by application of voltage. (Dynamic scattering).
2. Direction of alignment of molecules is changed by application of voltage and modulation of light is carried out by double refraction (DAP).
3. Voltage is applied to a liquid crystal material containing polygenetic dyes resulting in change of color tone.

Use of homeotropic structure in liquid crystal displaying serves to improve transparency where the applied voltage is zero. The methods (2) and (3) can accomplish effective display only when the liquid crystal has homeotropic structure.

The following example illustrates the present invention.

As the liquid crystal material, a mixture of the following compounds in a weight ratio of 1 : 1 : 1 was used.

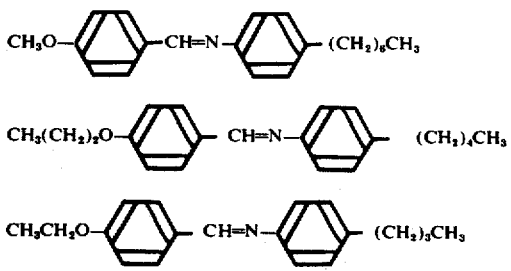

A light receptor was placed at the position of the observer 14 in FIG. 2 and the quantity of light transmitted was measured. The ratio of the quantity of light transmitted using the liquid crystal material containing 1 % by weight of the additive and using the liquid crystal material containing no additive was calculated from the following formula.

The ratio $x = \dfrac{\text{Quantity of light transmitted by the liquid crystal containing the additive}}{\text{Quantity of light transmitted by the liquid crystal containing no additive}}$ The results are shown in the following table.

| Additives | | x |
|---|---|---|
| In the following general formula(1); | $m_1 = 0$ | 1/1 − 1/2 |
| " | $m_1 = 1$ | 1/1 − 1/2 |
| " | $m_1 = 2$ | 1/1 − 1/2 |
| " | $m_1 = 3$ | 1/1 − 1/2 |
| " | $m_1 = 4$ | 1/1 − 1/3 |
| " | $m_1 = 5$ | 1/1 − 1/3 |
| " | $m_1 = 6$ | 1/2 − 1/4 |
| " | $m_1 = 7$ | 1/4 − 1/10 |
| " | $m_1 = 8$ | 1/4 − 1/10 |
| " | $m_1 = 11$ | 1/10 − 1/15 |
| " | $m_1 = 15$ | 1/10 − 1/15 |
| In the following general formula(2); | $m_1 = 0$ | 1/1 |
| " | $m_1 = 1$ | 1/1 |
| " | $m_1 = 5$ | 1/1 − 1/2 |
| " | $m_1 = 8$ | 1/4 − 1/10 |
| " | $m_1 = 11$ | 1/5 − 1/10 |
| " | $m_1 = 15$ | 1/5 − 1/10 |
| In the following general formula(3); | $m_1 = 0$ | 1/1 − 1/2 |
| " | $m_1 = 1$ | 1/1 − 1/2 |
| " | $m_1 = 5$ | 1/1 − 1/3 |
| " | $m_1 = 7$ | 1/4 − 1/10 |
| " | $m_1 = 11$ | 1/10 − 1/15 |
| " | $m_1 = 15$ | 1/10 − 1/15 |
| In the following general formula(4); | $m_2 = 0$ | 1/1 |
| " | $m_2 = 1$ | 1/1 |
| " | $m_2 = 3$ | 1/1 − 1/2 |
| " | $m_2 = 5$ | 1/2 − 1/6 |
| " | $m_2 = 7$ | 1/2 − 1/6 |
| " | $m_2 = 9$ | 1/4 − 1/6 |
| " | $m_2 = 10$ | 1/4 − 1/8 |
| " | $m_2 = 11$ | 1/4 − 1/8 |
| " | $m_2 = 13$ | 1/8 − 1/15 |
| " | $m_2 = 15$ | 1/8 − 1/15 |
| In the following general formula(5); | $m_2 = 0$ | 1/1 |
| " | $m_2 = 3$ | 1/1 − 1/2 |
| " | $m_2 = 5$ | 1/2 − 1/6 |
| " | $m_2 = 9$ | 1/4 − 1/6 |
| " | $m_2 = 11$ | 1/4 − 1/8 |
| " | $m_2 = 13$ | 1/4 − 1/8 |
| " | $m_2 = 15$ | 1/8 − 1/15 |
| In the following general formula(6); | $m_3 = 0$ | 1/1 |
| " | $m_3 = 3$ | 1/1 − 1/2 |
| " | $m_3 = 7$ | 1/2 − 1/6 |
| " | $m_3 = 9$ | 1/4 − 1/6 |
| " | $m_3 = 10$ | 1/5 − 1/10 |
| " | $m_3 = 11$ | 1/5 − 1/10 |
| " | $m_3 = 13$ | 1/8 − 1/15 |
| " | $m_3 = 15$ | 1/8 − 1/15 |
| In the following general formula(7); | $m_3 = 0$ | 1/1 |
| " | $m_3 = 3$ | 1/1 − 1/2 |
| " | $m_3 = 7$ | 1/1 − 1/4 |
| " | $m_3 = 9$ | 1/2 − 1/6 |
| " | $m_3 = 10$ | 1/4 − 1/8 |
| " | $m_3 = 11$ | 1/4 − 1/8 |
| " | $m_3 = 13$ | 1/8 − 1/15 |
| " | $m_3 = 15$ | 1/8 − 1/15 |
| " | $m_3 = 17$ | 1/10 − 1/15 |

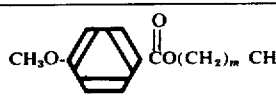  (1)

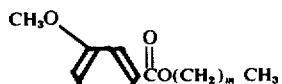  (2)

  (3)

As is clear from the above table, when $m_1 \geq 7$, $m_2 \geq 10$ or $m_3 \geq 10$, the liquid crystal had homeotropic structure.

Regarding RO in the general formula, any alkoxy groups may be used.

As mentioned above, according to the present invention, an homeotropic structure is imparted to a nematic liquid crystal. Therefore, when this liquid crystal material is used in a liquid crystal display device, this device is excellent in transparency and can produce effective display.

What is claimed is:

1. A liquid crystal display device comprising a liquid crystal material having homeotropic structure which is comprised of a nematic liquid crystal and at least one of the compounds having the following general formula:

$$(RO)_n\!\!-\!\!\bigcirc\!\!-M$$

wherein M is a member selected from $$-\!\overset{O}{\underset{\|}{C}}\!O(CH_2)_m\!-\!CH_3\ (m_1 \geq 7),$$

$$-\!O\overset{O}{\underset{\|}{C}}(CH_2)_m\!-\!CH_3\ (m_2 \geq 10)\text{ and}$$

$$-\!\overset{O}{\underset{\|}{C}}(CH_2)_m\!-\!CH_3\ (m_3 \geq 10),$$

—OR is an alkoxy group, n is 1, 2 or 3 and said group —OR is at the para-position to M when $n = 1$, at the metapositions to M when $n = 2$ and at the meta- and para-positions to M when $n = 3$.

2. A liquid crystal display device as claimed in claim 1, which is provided with means for applying a voltage to the liquid crystal material.

3. A liquid crystal display device as claimed in claim 1, which comprises spaced glass substrates between which the liquid crystal material is placed.

4. A liquid crystal display device as claimed in claim 1, wherein amount of the compound added to the liquid crystal material is 0.5 to 5 % by weight.

* * * * *